July 11, 1967  J. A. BICHARD  3,330,757
CHEMICAL TREATMENT OF ATHABASKA FROTH
Filed April 2, 1965
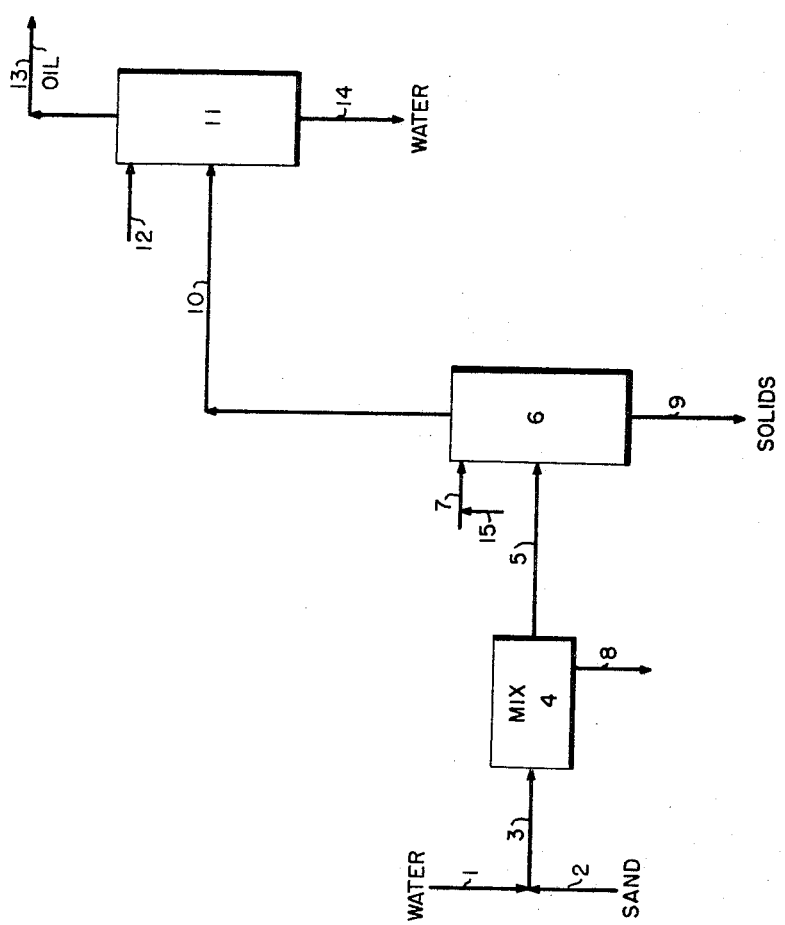
John A. Bichard  Inventor
By W. O. Heilman
Patent Attorney United States Patent Office 3,330,757
Patented July 11, 1967

3,330,757
CHEMICAL TREATMENT OF ATHABASKA FROTH
John A. Bichard, Point Edward, Ontario, Canada, assignor to Esso Research and Engineering Company, a corporation of Delaware
Filed Apr. 2, 1965, Ser. No. 445,206
7 Claims. (Cl. 208—11)

The present invention is broadly concerned with the recovery of hydrocarbons from tar sands. The invention is more particularly concerned with an improved technique of efficiently removing hydrocarbons such as bitumen, tars and the like from tar sands containing the same, such as Athabaska tar sands. These sands contain from about 80 to 90% by weight, as for example about 85% by weight of solids. The water content ranges from about 0 to 10% by weight, as for example about 5% by weight while the oil content is in the range from about 5 to 21% by volume, such as about 12% by volume.

The invention is more particularly concerned with an improved integrated process for the recovery of oil from tar sands wherein in a first or initial stage a substantial amount of the solids are removed by treatment of the sands with water wherein an oil froth is produced. This oil froth in essence comprises an emulsion of oil and water containing an appreciable amount of solids. This froth is treated in a secondary phase or stage with water containing a selected chemical mixture to substantially completely remove the solids from the emulsion of oil and water. This chemical mixture in essence is designed to remove not only the sand and clay but also heavy minerals from the emulsion. In a tertiary stage the emulsion, substantially completely free of solids, is treated to break the emulsion so as to secure an oil phase and a water phase.

In various areas of the world, tar sands exist which contain various types of hydrocarbons, as for example the heavy deposits of Athabaska tar sands existing in Canada. These sands contain tremendous reserves of hydrocarbon constituents. For example, the oil or bitumen in the sands may vary from about 5% to 21% by volume, generally in the range of about 12% by volume. The gravity of the oil ranges from about 6° to 10° API, generally about 8° API. These sands may lie from about 200 to 300 feet below an overburden and the beds may range from about 100 to 400 feet thick. A typical oil recovered from the sands has an initial boiling point of about 300° F., 1.0% distilled to 430° F., 20.0% distilled to 650° F. and 50.0% distilled to 980° F.

However, the separation or recovery of hydrocarbons from the solids in the past has not been effective to any great extent due to the deficiencies in operating techniques for the recovery of these hydrocarbons. For example, a relatively small amount of clay (from about 1% to 30%, usually about 10%) in the sand greatly retards recovery of the oil utilizing conventional water techniques. Apparently the oil and the clay form skins which envelop small pockets of water often containing finely divided sand; then the enveloped pockets are distributed in water, thus forming a type of emulsion. Numerous attempts have been made in the past to recover bitumen from the Athabaska tar sands by various techniques. For example, it has been suggested that a solvent be added in order to reduce the viscosity of the bitumen, and in conjunction with water, to float the bitumen solvent mixture away from the sand. Although this technique achieves a good separation of clean sand, the addition of water results in problems with the formation of stable emulsions and sludges which have been very difficult to separate. Thus extensive supplementary processing has been required in order to avoid large oil losses. It has now been discovered that if a chemical mixture be used, particularly in a sequential three-stage operation, excellent separation of the solids from the oil is secured. This chemical mixture in essence are chelating or complexing agents used in combination with transfer agents.

The process of the present invention may be more fully understood by reference to the drawing illustrating one embodiment of the same. Referring to the drawing, water is introduced into the system by means of line 1 and Athabaska tar sands as described by means of line 2. The mixture is passed by means of line 3 into an initial or mixing zone 4 which may comprise any type or any number of stages.

The amount of water used in zone 4 based upon the volume of tar sands may be varied appreciably, as for example from 0.5 to 2.0 volumes of water, preferably 0.8 to 1.2 volumes such as 1 to 1 volume of water per volume of tar sands. Temperatures maintained in zone 4 are in the range from about 140° F. to 200° F., preferably in the range from 170° F. to 190° F. such as about 180° F. Under these conditions, most of the solids, particularly the sand, is removed from zone 4 by means of line 8.

Under these conditions, a froth or emulsion comprising water, nonseparated solids and oil is produced which is removed from zone 4 by means of line 5. The froth comprises from about 15 to 50% by weight of water, as for example 30% by weight of water, from about 5 to 25% by weight of solids, as for example about 15% by weight of solids, the remainder being bitumen. This froth is introduced into secondary zone 6 wherein the same is preferably countercurrently contacted with water which is introduced into zone 6 by means of line 7. The amount of water used in zone 6 as compared to the volume of froth is in the range from about 0.5 to 1.5 volumes of water, preferably 0.8 to 1.2 such as 1 to 1 volume of water per volume of froth. The temperature in zone 6 is maintained in the range from 160° F. to 200° F., such as about 180° F.

Heretofore it had been thought that these 15% by weight of solids in the froth consisted substantially entirely of clay and silica and that a transfer agent such as an alkali metal phosphate, as for example tetrasodium pyrophosphate would function to completely remove the solids from the froth. However, it was discovered that these 15% by weight of solids in the froth contain large amounts of heavy minerals. These heavy minerals are for example Zircon, Ilmenite, Tourmaline, Staurolite, Garnet, etc. Typical solids composition in the froth comprise clay such as Illite, Kaolinite, etc. Thus the solids in the froth may contain from about 30 to 80% of nonclay and nonsilica constituents. Thus the water introduced by means of line 7 preferably contains from about 0.1 to 2.0% based upon the froth, preferably about 1% by weight of a "transfer agent" such as a phosphate. Suitable phosphates are sodium tripolyphosphate, tetrasodium pyrophosphate, trisodium phosphate, sodium hexametaphosphate and condensed phosphates. Other suitable "transfer agents" are sodium silicate and silicates having $SiO_2:Na_2O$ moduli of $\leq 1$. Other chemicals which may be used as "transfer agents" are for example sodium hydroxide, sodium bicarbonate, sodium carbonate, sodium sulphide, sodium hydrosulphide, sodium cyanide, sodium hydroxide with carboxymethylcellulose, ammonium hydroxide (and similar salts of other alkali metal cations, e.g. K). Buffered solutions of 9±1 pH are preferred.

In accordance with the present invention, the second essential constituent of the chemical mixture used in secondary zone 6 and introduced by means of line 15 is a chelating agent. The amount of chelating agent added is from 0.01 to 0.5%, preferably about 0.1% by weight based on the froth. These chelating agents are based upon the conversion of nitriles to amidoximes through the addition of hydroxylamine. Other satisfactory chelating agents which can be used as part of the chemical mixture introduced into zone 6 by means of line 15 are 1,2,diaminocyclohexane N-N' tetra acetic acid, diethylene triamine penta acetic acid, ethylene diamine tetra acetate, ethylene diamine tetra methylene phosphonic acid, N-hydroxyethyl-ethylene diamine triacetic acid, ethylene diamine N-N diacetic acid, nitrilotriacetic acid, amino barbituric acid N-N diacetic acid, N-hydroxyethylimino diacetic acid, adenosine phosphate, oxalic, gluconic, citric and tartaric acids.

The solids, including the heavy minerals contained in the froth or emulsion and treated with the chemical mixture in zone 6, are precipitated and removed by means of line 9 while the substantially solids-free emulsion comprising oil and water is removed overhead from zone 6 by means of line 10 and introduced into tertiary zone 11. In this tertiary zone, the emulsion is contacted with a select demulsifier mixture which is introduced by means of line 12. The amount of demulsifier added by means of line 12 is in the range from 0.05 to 0.5% by weight, as for example 0.1% of the total emulsion. A substantially water-free oil phase is removed by means of line 13 while the oil-free water phase is removed by means of line 14.

One preferred demulsifying solution comprises a mixture of: (1) one part of the reaction product of diethyl ethanol amine with premixed propylene oxide and ethylene oxide. (Propylene oxide/methylene oxide can range from 40/60 to 60/40, preferably 55/45.) (2) approximately three parts of a palmitic acid ester of the reaction product of an alkyl phenol formaldehyde resin with ethylene oxide $$\left(\frac{\text{alkyl phenol formaldehyde}}{\text{ethylene oxide}} = \frac{1}{1.5}\right)$$

The mixture may be varied in the range from about one part of the reaction product to two parts of the acid ester to one part of the reaction product to four parts of the palmitic acid ester.

While the preferred demulsifying mixture for use in tertiary zone 11 is as described, it is to be understood that other demulsifying agents may be used in tertiary zone 11, as for example (N-cetyl or) N-soya-N ethyl morpholinium ethosulphate, polyoxyethylene sorbitan fatty acid esters (e.g. laurate, palmate, stearate, oleate, etc.), polyoxyethylene alcohols (e.g. cetyl, lauryl, etc.), polyoxyethylene sorbitol esters (e.g. oleate). It has been found that combinations of these and other surfactants to give mixtures having an hydrophile-lypophile balance (HLB) within the ranges of 6–10 and 14–20 and preferably 10 and 18 have been found to be very effective agents.

As pointed out heretofore, the invention in essence consists in the use of a chemical mixture for the removal of solids from a froth wherein the solids consist of an appreciable amount of heavy minerals. The technique is particularly adapted for use in a three-stage operation as described for the recovery of oil from tar sands.

EXAMPLE

In Operations A and B, similar portions of tar sands were mixed with one volume of water to one volume of tar sands and contacted in an initial zone at a temperature of about 180° F. Under these conditions sand separated and was removed from the froth. The respective froths contained about 15% by weight or solids based upon the total froths.

In Operation A, the froth was contacted in a secondary zone with additional water which contained about 1% by weight of sodium tripolyphosphate. The temperature in the secondary zone was maintained at about 100° F.

In Operation B, the froth was contacted in a manner as described with respect to Operation A except that the water also contained about 0.5% by weight of an amidoxime chelating agent.

In Operation A, approximately 80% of the remaining sands separated in the secondary zone, while in Operation B substantially 100% of the sand was separated from the froth. Both froths were then passed to a tertiary zone and the emulsions broken by the use of a demulsifying agent. In Operation B the oil phase contained substantially no water, while in Operation A the oil phase contained about 2% of water.

Thus it is apparent that the use of a chelating agent in combination with a transfer agent in the secondary stage for the treatment of the froth produces unexpected beneficial results.

What is claimed is:

1. Process for the separation of bitumen from tar sands which comprises contacting tar sands in an initial stage with about 0.5 to 2.0 volumes of water per volume of tar sands at a temperature in the range from about 140° F. to 200° F., whereby sands separate and a froth is formed containing from about 5 to 25% by weight of solids of which about 30 to 80% are heavy minerals; removing the sands from said initial stage and passing the froth containing said heavy minerals to a secondary stage and countercurrently contacting the same in the secondary stage with 0.5 to 1.5 volumes of additional water per volume of froth, said additional water containing a chelating agent present in a concentration of 0.01 to 0.5% by weight based on the froth and a transfer agent present in a concentration of about 0.1 to 2.0% by weight based upon the froth whereby substantially all the remaining sands are removed from the froth; withdrawing the froth from the upper area of said secondary stage and passing the froth to a tertiary stage and contacting the same in said tertiary stage with a demulsifying agent to produce a substantially water-free oil phase.

2. Process as defined by claim 1 wherein said chelating agent is an amidoxime produced by the conversion of nitriles through the addition of hydroxy amine and wherein said transfer agent is sodium tripolyphosphate.

3. Process as defined by claim 2 wherein said chelating agent is present in a concentration of about 0.5% by weight and wherein said transfer agent is present in a concentration of about 1% by weight based upon the total froth.

4. Process as defined by claim 1 wherein said demulsifying agent used in said tertiary stage is a mixture of (1) one part of the reaction product of diethyl ethanol amine with premixed ethylene oxide and propylene oxide and (2) approximately three parts of a palmitic acid ester of the reaction product of an alkyl phenol formaldehyde resin with ethylene oxide, said reaction product having the following ratio, $$\frac{\text{alkyl phenol formaldehyde}}{\text{ethylene oxide}} = \frac{1}{1.5}$$

5. Process for the separation of bitumen from tar sands which comprises contacting tar sands in an initial stage with from about 0.5 to 2.0 volumes of water per volume of sand at a temperature in the range from about 140° F. to 200° F. whereby sands separate and a froth is formed, said froth consisting of about 15 to 50% by weight of water, 5 to 15% by weight of solids containing about 30 to 80% by weight of heavy minerals, the remainder being bitumen; removing the sands from said initial stage and passing the froth to a secondary stage and countercurrently contacting the same in the secondary stage with from about 0.5 to 2.0 volumes of water per volume of sand, said water containing a chelating agent present in a concentration of about 0.01 to 0.5% by weight and an alkali metal phosphate present in a concentration in the range from about 0.1 to 2.0% by weight whereby substantially all the remaining sands are removed from the froth; removing the froth from the upper area of said secondary stage and passing the froth to a tertiary stage and contacting the same in said tertiary stage with a demulsifying agent to produce a substantially water-free oil phase.

6. Process as defined by claim 5 wherein said chelating agent comprises 1,2,diaminocyclohexane N-N' tetra acetic acid.

7. Process as defined by claim 6 wherein said demulsifying agent is a mixture of (1) one part of the reaction product of diethyl ethanol amine with premixed ethylene oxide and propylene oxide and (2) approximately three parts of a palmitic acid ester of the reaction product of an alkyl phenol formaldehyde resin with ethylene oxide, said reaction product having the following ratio, $$\frac{\text{alkyl phenol formaldehyde}}{\text{ethylene oxide}} = \frac{1}{1.5}$$

References Cited

UNITED STATES PATENTS

| | | | |
|---|---|---|---|
| 2,453,060 | 11/1948 | Bauer et al. | 208—11 |
| 2,454,541 | 11/1948 | Bock et al. | 252—331 |
| 2,825,677 | 3/1958 | Coulson | 208—11 |
| 2,875,157 | 2/1959 | Kirkpatrick | 252—344 |
| 2,914,484 | 10/1959 | Monson et al. | 252—340 |
| 2,957,818 | 10/1963 | Fischer | 208—11 |
| 3,107,260 | 10/1963 | Knell | 260—534 |
| 3,150,160 | 9/1964 | Dexter | 260—534 |

FOREIGN PATENTS

| | | |
|---|---|---|
| 488,928 | 12/1952 | Canada. |
| 586,229 | 11/1959 | Canada. |
| 637,442 | 2/1962 | Canada. |
| 680,576 | 2/1964 | Canada. |

DANIEL E. WYMAN, *Primary Examiner.*

P. E. KONOPKA, *Assistant Examiner.*